(12) United States Patent
McIntyre et al.

(10) Patent No.: US 9,193,577 B2
(45) Date of Patent: Nov. 24, 2015

(54) SYSTEMS AND METHODS FOR BEVERAGE PRESERVATION

(71) Applicants: Keith W. McIntyre, Bellevue, WA (US); John J. Parry, Sammamish, WA (US)

(72) Inventors: Keith W. McIntyre, Bellevue, WA (US); John J. Parry, Sammamish, WA (US)

(*) Notice: Subject to any disclaimer, the term of this patent is extended or adjusted under 35 U.S.C. 154(b) by 0 days.

(21) Appl. No.: 14/700,011

(22) Filed: Apr. 29, 2015

(65) Prior Publication Data
US 2015/0232316 A1 Aug. 20, 2015

(51) Int. Cl.
| | |
|---|---|
| *B67D 1/04* | (2006.01) |
| *A23L 3/00* | (2006.01) |
| *B67D 1/00* | (2006.01) |
| *B67D 1/08* | (2006.01) |
| *B67D 1/12* | (2006.01) |
| *B67D 1/14* | (2006.01) |

(52) U.S. Cl.
CPC . *B67D 1/04* (2013.01); *A23L 3/001* (2013.01); *B67D 1/0004* (2013.01); *B67D 1/0831* (2013.01); *B67D 1/125* (2013.01); *A23V 2002/00* (2013.01); *B67D 1/0418* (2013.01); *B67D 1/0801* (2013.01); *B67D 1/0885* (2013.01); *B67D 1/12* (2013.01); *B67D 1/14* (2013.01); *B67D 2001/0822* (2013.01); *B67D 2001/0824* (2013.01)

(58) Field of Classification Search
CPC ............. B67D 1/04; B67D 1/00; B67D 1/08; B67D 1/12; B67D 1/14; B67D 1/0418; B67D 1/0801; B67D 1/0802; B67D 2001/0822; B67D 2001/0824; B67D 2001/0825; B67D 1/0885; B67D 1/0004; B67D 1/0831; B67D 1/125; A23L 3/001; A23V 2002/00
See application file for complete search history.

(56) References Cited

U.S. PATENT DOCUMENTS

| | | | | | |
|---|---|---|---|---|---|
| 2,120,297 | A | * | 6/1938 | Reinecke | 261/122.1 |
| 2,593,770 | A | * | 4/1952 | Kollsman | 261/64.3 |
| 3,801,015 | A | * | 4/1974 | Hayes | 239/175 |
| 4,856,680 | A | * | 8/1989 | Sitton | 222/152 |
| 4,869,402 | A | * | 9/1989 | Ash, Jr. | 222/209 |
| 5,199,609 | A | * | 4/1993 | Ash, Jr. | 222/94 |
| 5,240,144 | A | * | 8/1993 | Feldman | 222/82 |
| 5,251,787 | A | * | 10/1993 | Simson | 222/95 |
| 5,529,220 | A | * | 6/1996 | Credle et al. | 222/175 |
| 5,810,213 | A | * | 9/1998 | Flores et al. | 222/610 |
| 5,921,445 | A | * | 7/1999 | Schmitz et al. | 222/385 |
| 6,783,034 | B1 | * | 8/2004 | Brent | 222/183 |
| 7,597,124 | B2 | * | 10/2009 | Litto | 141/285 |

* cited by examiner

*Primary Examiner* — Frederick C Nicolas
(74) *Attorney, Agent, or Firm* — Pugent Patent; Michael Gibbons

(57) ABSTRACT

A receptacle for storing, pressurizing, and dispensing packaged beverages. An airtight chamber with a removable lid, wherein the joint between the lid and the chamber is also airtight. A gas valve allows for the inflow and outflow of gas, and a tap port and tap stem allow the beverage to be dispensed without breaking the seal of the chamber. A pressure relief valve allows for more rapid depressurization. Chamber can also be used at high and low pressures, such as a partial vacuum, to prevent oxidation of a number of open beverages, such as beers, wines, and sodas. Can be used with multiple types of gas, and is coupleable with both American and European tap systems. A pressure gauge port allows a user to verify the appropriate pressure for the type of beverage being preserved. Lid may have multiple taps to allow for the storage of multiple beverages.

20 Claims, 14 Drawing Sheets

SYSTEMS AND METHODS FOR BEVERAGE PRESERVATION

FIELD OF THE INVENTION

This invention relates generally to receptacles, and, more specifically, to receptacles for storing and preserving packaged beverages.

BACKGROUND OF THE INVENTION

Opening a packaged beverage invariably leads to oxidation of the beverage. Additionally, beverages that are carbonated or otherwise gas-dispensed, such as with carbon dioxide or nitrogen, will begin to lose the gas once the pressure is released, causing the beverage to go flat. The present disclosure contains systems and methods for preservation of packaged beverages.

SUMMARY

This invention relates generally to receptacles, and, more specifically, to receptacles for storing and preserving packaged beverages. The receptacle is comprised essentially of a vessel and a lid, and it is designed to receive packaged beverages.

In some embodiments, the beverage preservation device may be comprised of a vessel; a lid with a top surface and a bottom surface, the lid removably coupled with the vessel; a gas valve, the gas valve disposed through the lid; and a tap port disposed through the lid. In some embodiments, the lid may further comprise a pressure relief valve disposed through the lid. In some embodiments, the lid may further comprise a gasket disposed on the bottom surface of the lid. In some embodiments, the lid may further comprise a pressure gauge port disposed through the lid. In some embodiments, the lid may further comprise a tap stem coupled with the tap port. In some embodiments, the tap stem may further comprise a rigid first portion coupled with the tap port; a flexible second portion coupled with the rigid first portion; and a rigid third portion coupled with the flexible second portion. In some embodiments, the flexible second portion of the tap stem may be slightly curved. In some embodiments, the lid and the vessel may be removably coupleable. In some embodiments, the lid coupled with the vessel may form an airtight seal.

In some embodiments, the beverage preservation device may comprise a vessel, the vessel further comprising: a base; a chamber joined with and perpendicular to the base, wherein the joint is airtight. The beverage preservation device may be further comprised of a lid with a top surface and a bottom surface, wherein an area of the lid is approximately equal to an area of the base, the lid further comprising: a gasket disposed on the bottom surface of the lid, wherein a perimeter formed by the gasket is approximately equal to a perimeter of the chamber; a gas valve, the gas valve disposed inside the perimeter of the gasket and through the top surface and the bottom surface of the lid, wherein the inlet of the valve is accessible from the top surface of the lid; and a pressure relief valve disposed inside the perimeter of the gasket and through the top surface and the bottom surface of the lid, wherein a control handle of the pressure relief valve is accessible from the top surface of the lid. In some embodiments, the lid may further comprise a pressure gauge port disposed within the perimeter of the gasket and through the top surface and the bottom surface of the lid. In some embodiments, the lid may further comprise a tap port disposed within the perimeter of the gasket and through the top surface and the bottom surface of the lid. In some embodiments, the lid may further comprise a tap stem, the tap stem further comprising: a rigid first portion coupled with the tap port and descending into the chamber; a flexible second portion with a first end and a second end, the first end coupled with the first portion; and a rigid third portion, the third portion coupled with the second end of the second portion. In some embodiments, the flexible second portion may be slightly curved.

In some embodiments, the beverage preservation device may comprise a vessel, the vessel further comprising: a base; a chamber joined with and perpendicular to the base, wherein the joint is airtight; and at least one bolt coupled with the base, disposed parallel and external to the chamber, wherein the bolt extends beyond the length of the chamber. In some embodiments, the beverage preservation device may be further comprised of a lid with a top surface and a bottom surface, wherein an area of the lid is approximately equal to an area of the base, the lid further comprising: a gasket disposed on the bottom surface of the lid, wherein a perimeter formed by the gasket is approximately equal to a perimeter of the chamber; a gas valve disposed inside the perimeter of the gasket and through the top surface and the bottom surface of the lid, wherein the inlet of the valve is accessible from the top surface of the lid; and a pressure relief valve disposed inside the perimeter of the gasket and through the top surface and the bottom surface of the lid, wherein a control handle of the pressure relief valve is accessible from the top surface of the lid; wherein the lid is removably coupleable with the vessel, the gasket of the lid forming an airtight joint between the lid and the vessel. In some embodiments, the beverage preservation device may be further comprised of a tap system disposed inside the perimeter of the gasket and through the top surface and the bottom surface of the lid. In some embodiments, the tap system may be coupleable with a standard keg tap system. In some embodiments, the beverage preservation device is further comprised of a pressure gauge port disposed inside the perimeter of the gasket and through the top surface and the bottom surface of the lid; and a pressure gauge removably inserted into the pressure gauge port.

In addition to the foregoing, various other methods, systems and/or program product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

This invention relates generally to receptacles, and, more specifically, to receptacles for storing and preserving packaged beverages. Specific details of certain embodiments of the invention are set forth in the following description and in FIGS. 1-11 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
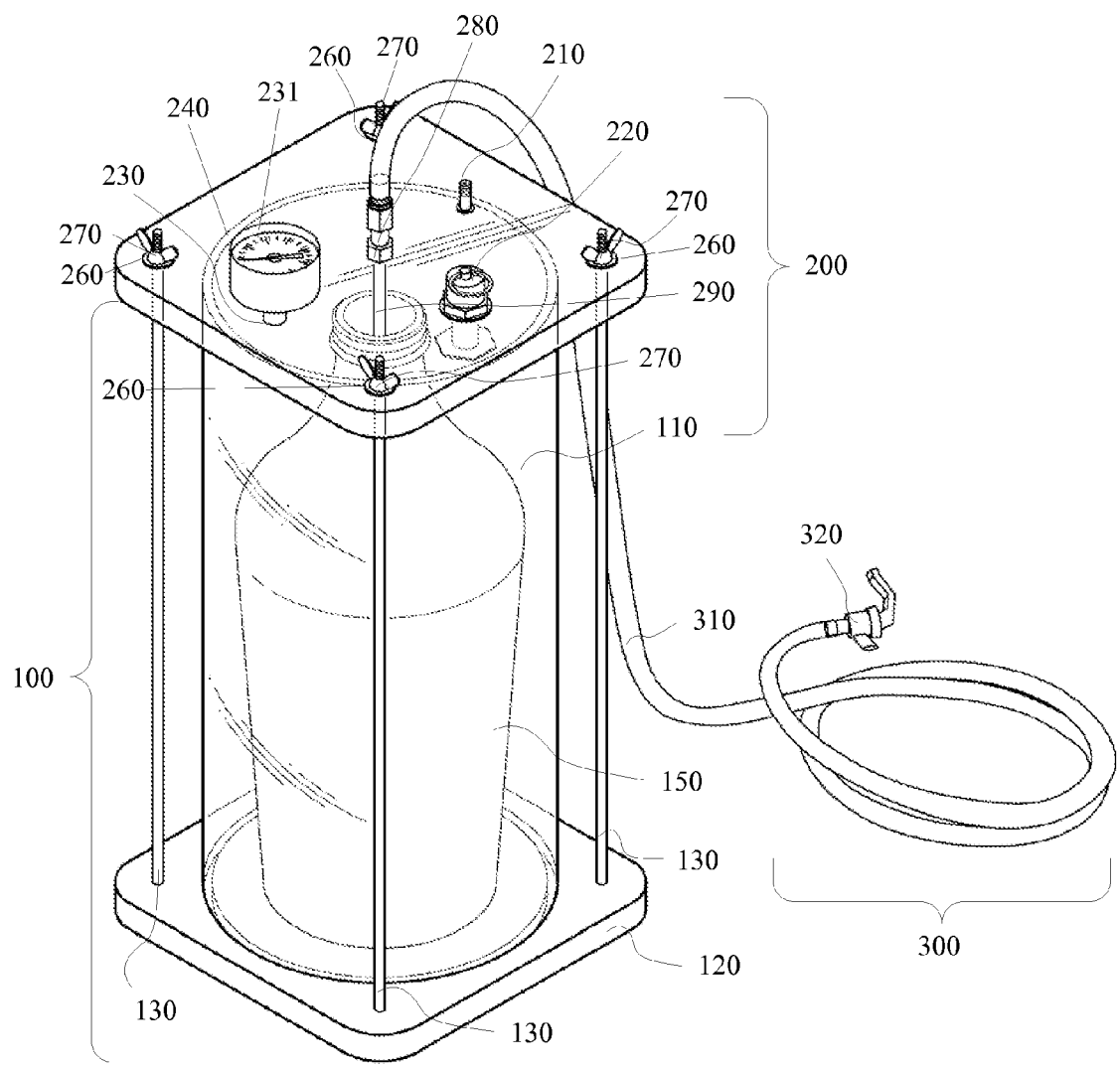
FIG. 1 is an isometric view of one embodiment of the receptacle for storing and preserving packaged beverages.

FIG. 1 is an isometric view of the receptacle for storing and preserving beverages. The receptacle is comprised essentially of a vessel 100 and a lid 200, and it is designed to receive beverage packages, such as beverage package 150.

In some embodiments, vessel 100 may be further comprised of a chamber 110. In some embodiments, chamber 110 may be tubular, having a volume formed by a circular perimeter. In other embodiments, chamber 110 may have a rectangular volume. In still other embodiments, chamber 110 may have a triangular volume. The volume formed by chamber 110 may be any number of shapes without altering the function of the device. In some embodiments, chamber 110 may be comprised of a thermoplastic resin material. Such material may include, but is not limited to, acrylic resin, acrylic plastic, or another acrylic formulation. In other embodiments, chamber 110 may be comprised of a metal. Further, chamber 110 may be comprised of any number of rigid or semi-rigid materials without altering its function. In some embodiments, chamber 110 may be comprised of a material with specific heat properties, such as being able to withstand very high or very low temperatures. In some embodiments, chamber 110 may be comprised of a material with specific strength properties, such as being able to withstand very high pressures exerted from within the chamber, being able to withstand very high external pressures, or being able to withstand a significant difference between the internal and external pressures on the chamber.

In some embodiments, vessel 100 may be further comprised of a base 120. Base 120 will generally be coupled with chamber 110 in such a manner that the joint is airtight. In some embodiments, base 120 will be approximately the same area as the perimeter formed by chamber 110. In other embodiments, the area of base 120 will be larger than the perimeter formed by chamber 110. Base 120 may be comprised of the same material as chamber 110. In other embodiments, base 120 may be comprised of a different material than chamber 110. In still other embodiments, base 120 and chamber 110 may be formed as a single unit, such that no seam exists between the two elements.

In some embodiments, vessel 100 may be further comprised of fastener 130. In some embodiments, vessel 100 may have multiple fasteners 130. In a non-limiting example, FIG. 1 shows vessel 100 with three fasteners 130, and a fourth is not shown as it is obscured by other elements. In another non-limiting example, if the perimeter formed by the chamber is triangular, vessel 100 may have only three fasteners 130, such as one at each vertex. A primary function of fastener 130 is to couple lid 200 with the vessel 100, and this function may be accomplished in a number of ways. Another primary function of the fastener is to create a removable airtight joint between vessel 100 and lid 200, which can also be accomplished in many ways. In some embodiments, fastener 130 may be a pin, rod or a bolt. In the exemplary embodiment shown in FIG. 1, fastener 130, which is a bolt, may be joined with base 120 and extend substantially parallel to the height of chamber 110, wherein lid 200 is placed on chamber 110 and bolts and washers are used to tighten the lid onto the chamber. This embodiment is discussed in more detail in another section. In other embodiments, fastener 130 may be comprised of a ratchet strap system, wherein the airtight joint is created by disposing the strap around the vessel 100 and lid 200 and cranking the ratchet until the strap is taut. In other embodiments, fastener 130 may be a clamp fastener, wherein a first portion of the fastener is coupled with the external perimeter of chamber 110 and a second portion of the fastener is coupled with lid 200, and the portions are coupled and tightened to form the airtight joint. In some embodiments, fastener 130 may be a system comprised of a clip and a toothed belt, wherein one of the clip or toothed belt is disposed on the external perimeter of the chamber 110 and the other of the clip or toothed belt is disposed on lid 200, then the portions are coupled and tightened to form the airtight joint. A number of methods could be used without altering the primary functions of fastener 130.

FIG. 1 further depicts details of lid 200. In some embodiments, lid 200 will be approximately the same area as the perimeter formed by chamber 110. In other embodiments, the area of lid 200 may be larger than the perimeter formed by chamber 110. Lid 200 may be comprised of the same material as chamber 110. In other embodiments, lid 200 may be comprised of a different material than chamber 110. In some embodiments, lid 200 is further comprised of a gas valve 210. Gas valve 210 is a port for gas, allowing a user to fill chamber 110 with a gas of the user's choice using a tank type of the user's choice. The valve may be a Schrader or Presta type valve. Such a valve would facilitate use of an inflator for bicycle tires as the tank type of choice. Other tank types of choice could include a paintball CO2 tank, a CO2 welding cylinder, or any other supply of CO2. The valve could also be a hose barb for receiving tubing leading to the tank type of choice. In a different embodiment, the valve may include a threaded fitting for receiving threadably-coupleable gas line tubing. Other gases may be introduced into the chamber, such as nitrogen, using an appropriate tank such as a nitrogen cylinder or a nitrogen bicycle inflator In some embodiments, a regulator may be disposed in the gas line, between the receptacle and gas tank of choice. The regulator facilitates a constant pressure within the receptacle. When beverage content is dispensed the regulator would provide more gas to the chamber up to the desired pressure set by the user.

In some embodiments, gas valve 210 may be a one-way valve, allowing a user to only add gas to chamber 110. In other embodiments, gas valve 210 may be a two-way valve, through which gas may be added or removed from the chamber. In some embodiments, lid 200 may be further comprised of a pressure relief valve 220. Pressure relief valve 220 allows a user to release a controlled or semi-controlled amount of gas to reduce the internal pressure of chamber 110. In different embodiments, the gas valve and pressure relief valve may be the same valve. Lid 200 may be further comprised of a pressure gauge port 230. Vessel 100 is designed to withstand a wide range of pressures, and a pressure gauge port gives users the option of attaching a pressure gauge 231 to monitor and help control the pressure in chamber 110.

A gasket 240 disposed in a channel on the bottom surface of lid 200 may, in some embodiments, be included to facilitate the airtight seal between vessel 100 and lid 200. In some embodiments, gasket 240 may be substantially the same shape and perimeter as chamber 110. In some embodiments, gasket 240 may be slightly larger or slightly smaller than the perimeter formed by chamber 110, in order to facilitate the proper joint between vessel 100 and lid 200. More details about gasket 240 are included further herein.

Lid 200 may be coupled with vessel 100 through fasteners 130. In the embodiment depicted in FIG. 1, fasteners 130 are bolts. When lid 200 is placed on top of vessel 100, fasteners 130 are passed through holes 250 (depicted in FIG. 2), and the joint is completed when washers 260 and nuts 270 are tightened onto the bolts. This is one exemplary embodiment of a coupling arrangement, and should not be construed as limiting the disclosure in any way.

Figure 9:
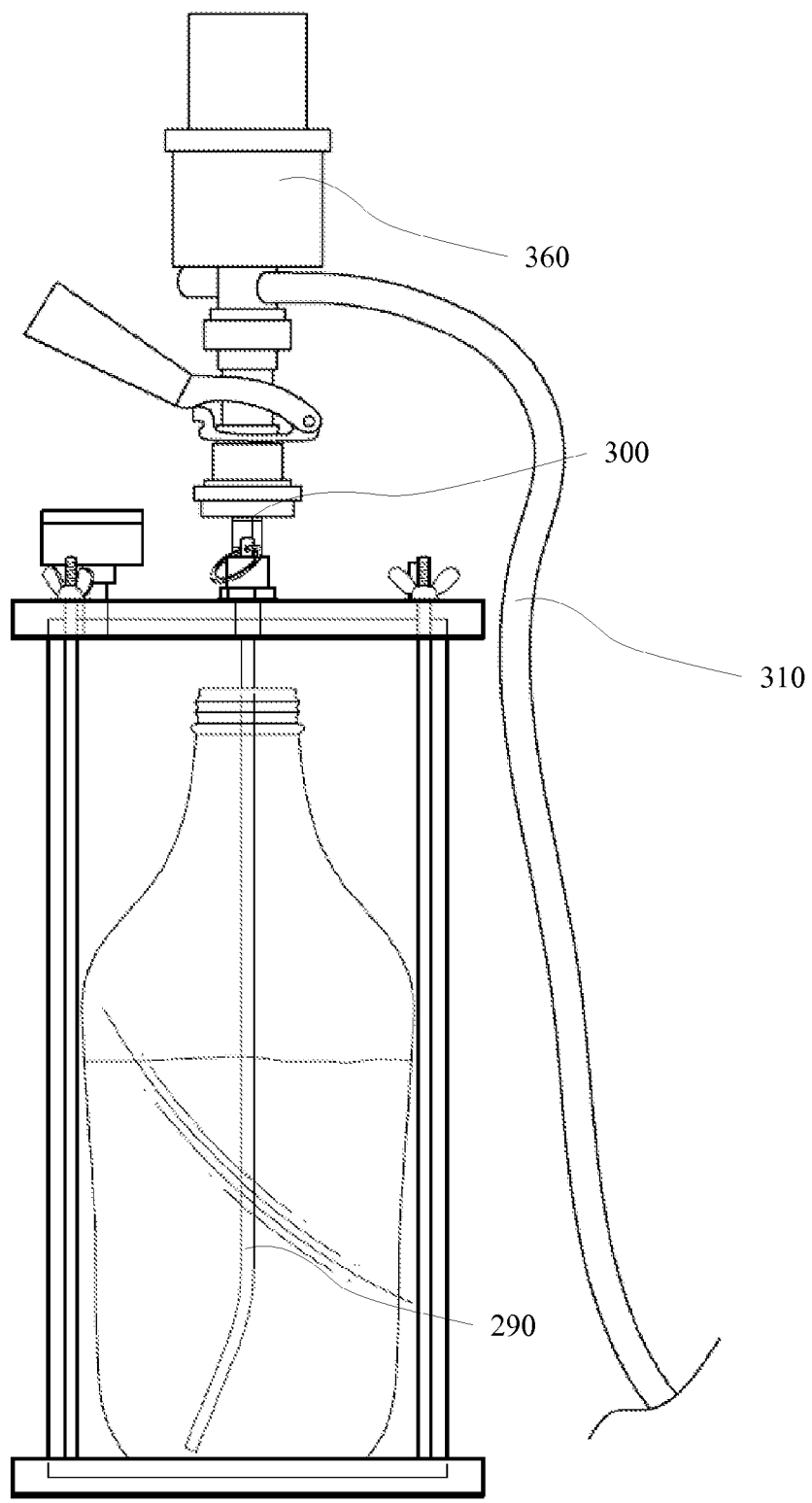
FIG. 9 is a side view of the receptacle with an alternative tap system.

The receptacle for storing and preserving beverages may include a means by which the beverage or other content can be dispensed without removing the package entirely. In FIG. 1, this is depicted by tap port 280. Tap port 280 allows a tap system 300 to be coupled with lid 200. Lid 200 may, in some embodiments, include a tap stem 290. In some embodiments, tap stem 290 is disposed through lid 200, coupled with tap port 280 and insertable into the beverage package, allowing a user to draw the beverage into the stem and then dispense through tap system 300. In some embodiments, tap port 280 may be a screw valve. In different embodiments, tap port 280 may be a hose barb. In some embodiments, tap port 280 may be a ball lock valve (depicted in FIG. 10). In other embodiments, tap port 280 may be a Sankey valve. In still other embodiments, tap port 280 may be coupleable with any commercial tap system, as depicted in FIG. 9. Tap system 300 may be as simple as a hose 310 with a tap spout 320 at the end. In other embodiments, tap system 300 may be a ball lock system, a Sankey system, an American tap system, or any other commercial tap system. In a preferred embodiment, tap port 280 can be coupled with any existing tap system the user may own.

Figure 2:
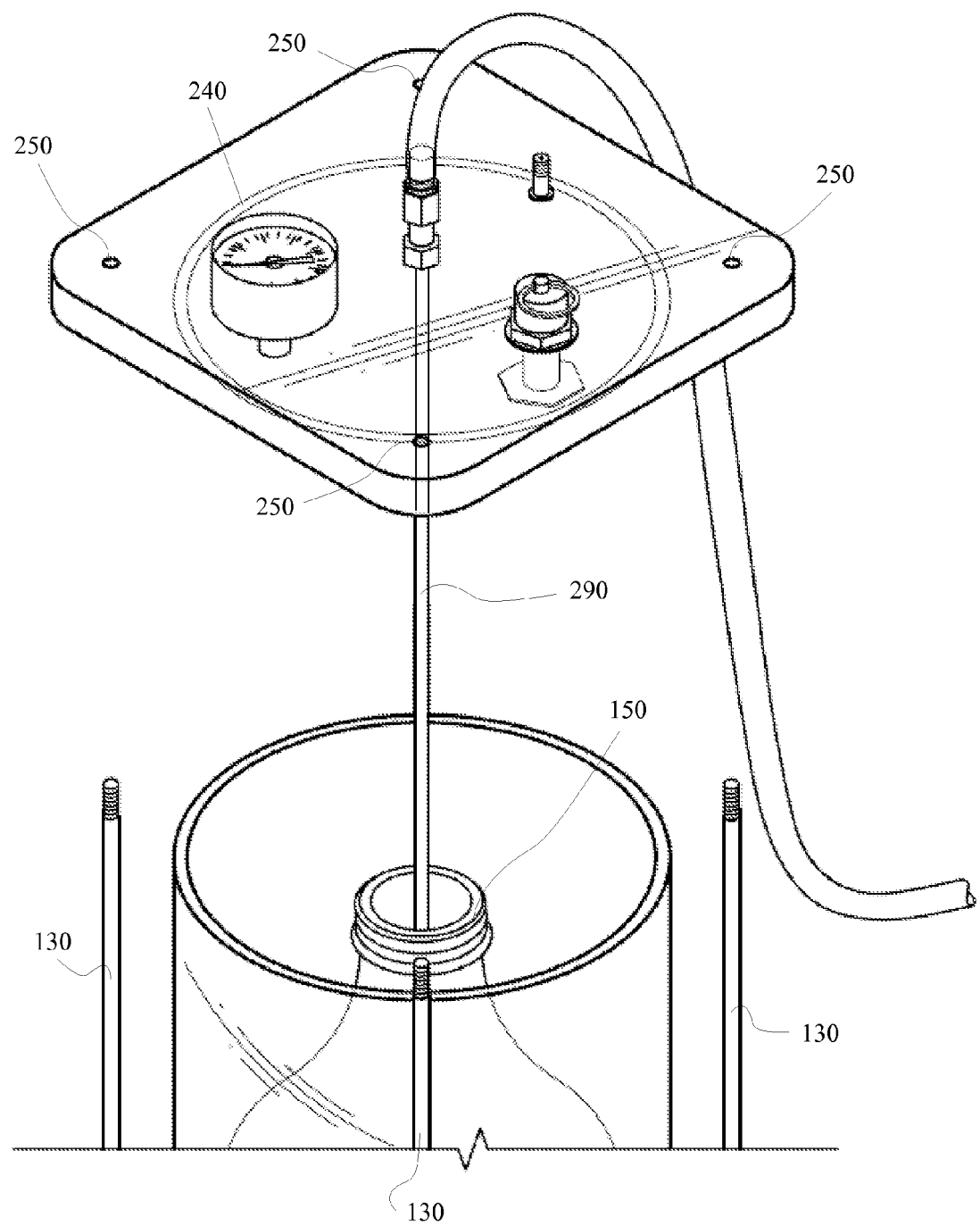
FIG. 2 is an isometric view of the receptacle, showing the lid removed from the top of the vessel.

FIG. 2 depicts how the lid and vessel of FIG. 1 when fasteners 130 are bolts. Fasteners 130 are disposed through holes 250, which aids the proper alignment between the perimeter of chamber 110 and gasket 240. Tap stem 290 descends into beverage package 150, allowing a user to dispense the beverage even when lid 200 is properly sealed onto vessel 100, isolating a beverage package inside the receptacle.

The method of use of the embodiment in FIGS. 1 and 2 may be comprised of removing lid 200 from vessel 100, then placing beverage package 150, in this example a beer growler, into chamber 110. Once beverage package 150 is in place, lid 200 is placed onto vessel 100, with the gasket disposed within a channel on the bottom surface of lid 200, the channel matching the perimeter formed by the rim of chamber 110. Fasteners 130 are disposed through holes 250 (shown in FIG. 2), and washers 260 are placed onto the fasteners. Bolts 270 are hand-tightened on fasteners 130 to form an airtight seal aided by compression of the gasket which is pressed into the channel on the bottom surface of the lid by the rim of the chamber during tightening of the bolts and fasteners. A gas tank of, for example, carbon dioxide is coupled with gas valve 210 and gas is pumped into chamber 110. The user may choose to open pressure relief valve 220 a few times to release any remaining oxygen from chamber 110. The user may choose to watch pressure gauge 231, which is coupled with lid 200 through port 230. When the gas has created the appropriate pressure for the particular beverage, the user will stop the flow of gas into chamber 110. When the user dispenses the beverage through tap system 300, the pressure gauge will fall, alerting the user that more gas should be pumped into the chamber. Alternatively, use of the receptacle with a CO2 tank and regulator will ensure that gas enters the chamber to supplement pressure lost by dispensing the beverage. When the user wishes to remove the growler from the chamber, the user simply interrupts the supply of gas and releases some of the pressure through pressure relief valve 220, then unscrews nuts 270, removes washers 260, and pulls the growler from the chamber.

Figure 3:
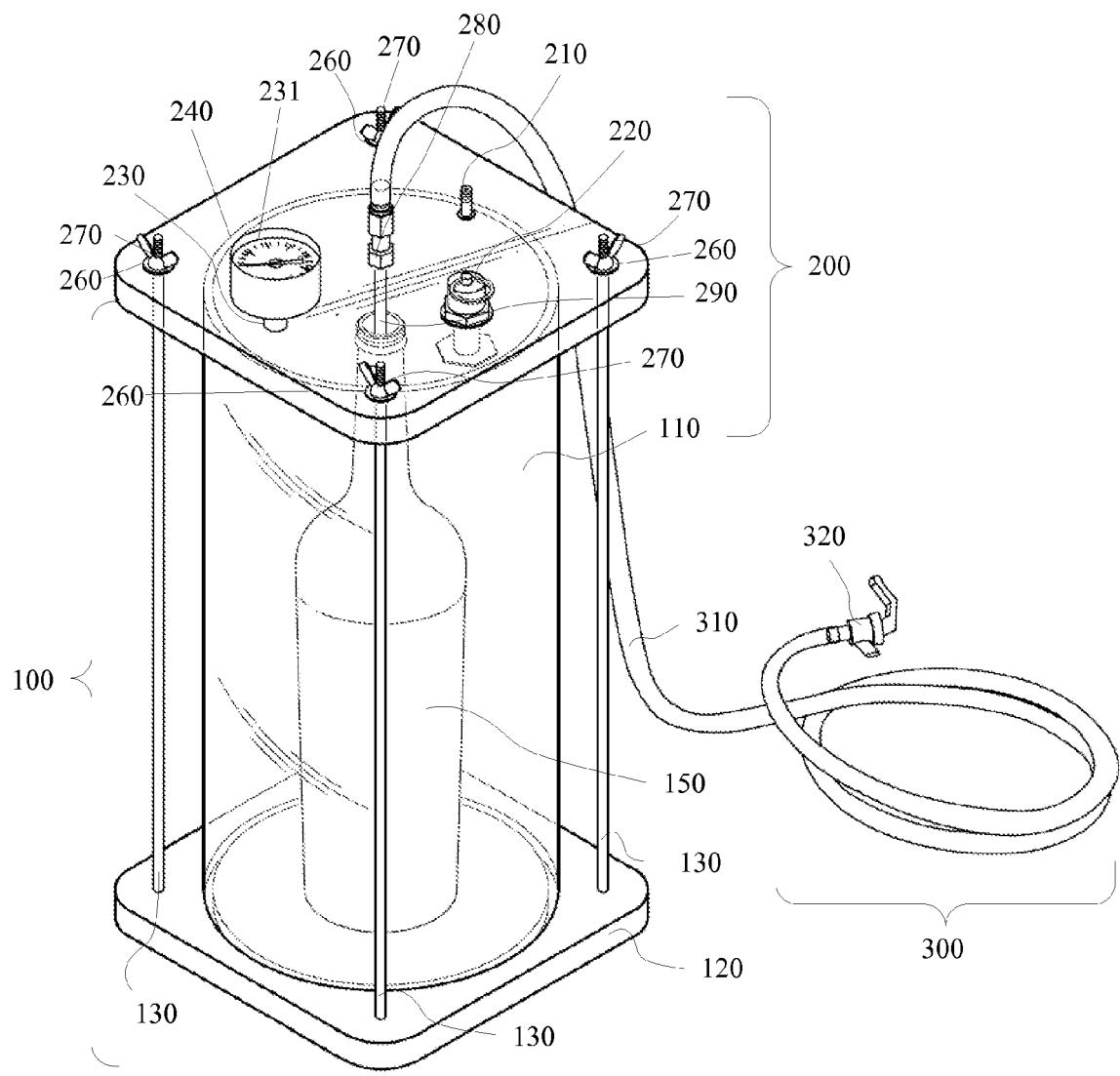
FIG. 3 is an isometric view showing an alternative implementation of the receptacle.

The present invention allows a user to make custom gas and pressure settings. This is critical because different packaged beverages require different gas environments and pressures to maintain freshness, effervescence, and/or entrained gas content. FIG. 3 depicts the invention as it might be used with a wine bottle as beverage package 150. Wine requires different gas and pressure settings than beer. For instance, a user may choose not to fill chamber 110 with gas, and may simply choose to substantially remove the ambient air from the chamber, creating a vacuum or near vacuum. In another example, a user may choose to replace the ambient air with nitrogen, which prevents the oxidation of the wine. Tap system 300 can still be used in this configuration, allowing a user to keep the wine free from exposure to oxygen, which substantially improves the life of the bottle.

Figure 4:
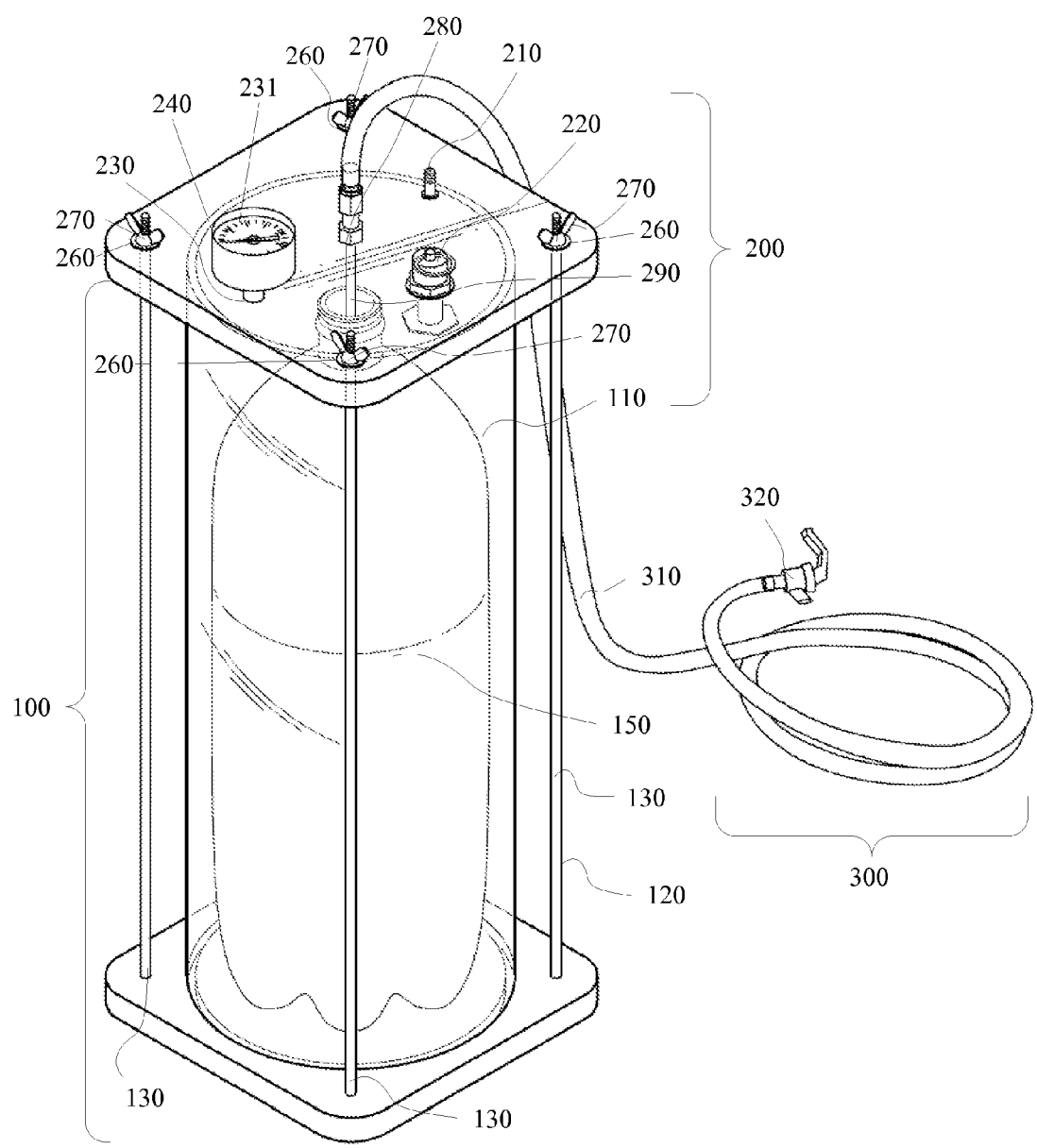
FIG. 4 is an isometric view showing an alternative implementation of the receptacle.
Figures 5A, 5B:
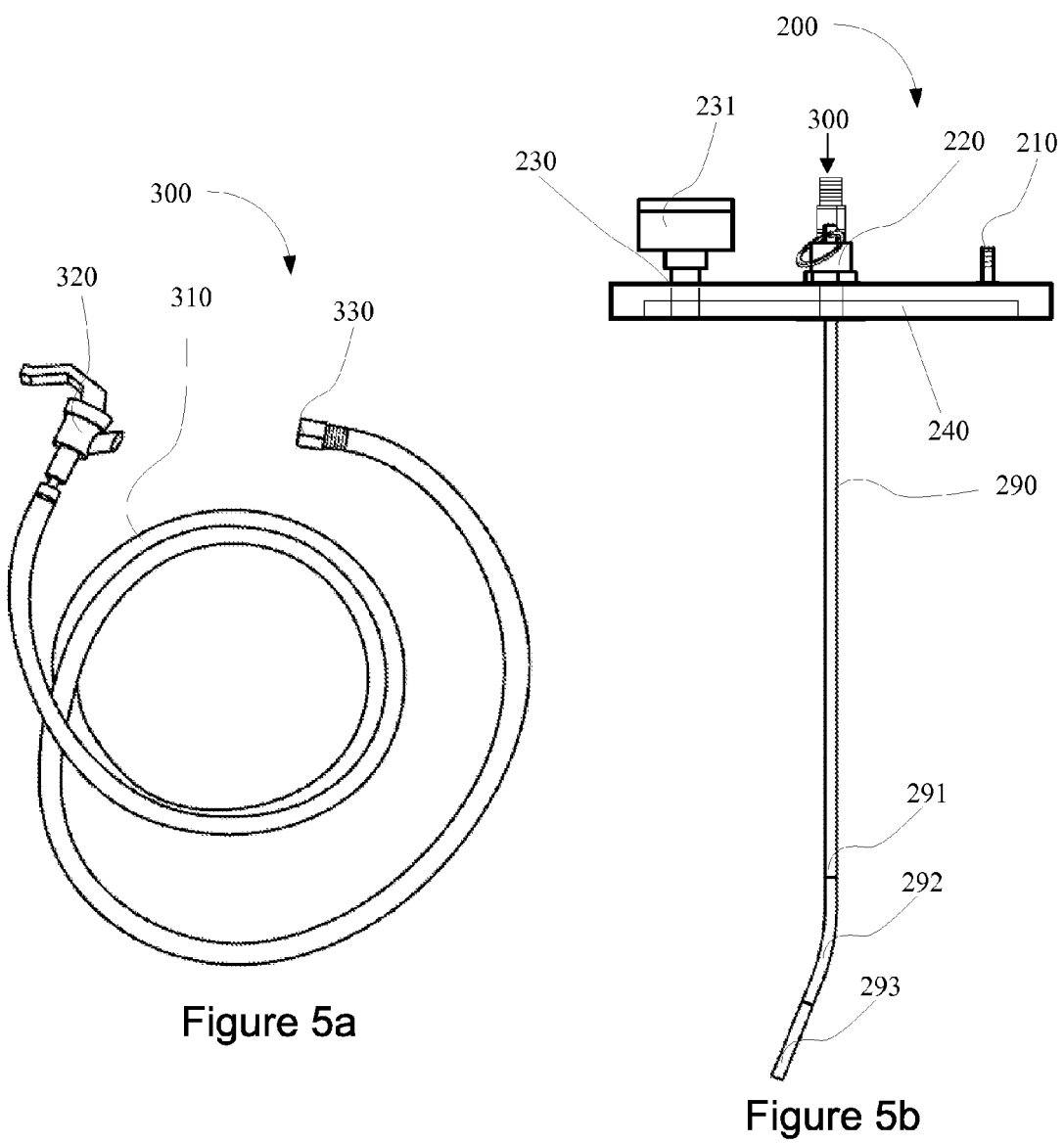
FIG. 5a is a top view of one embodiment of the tap system.
FIG. 5b is a side view of the lid of the receptacle.

FIG. 4 depicts the invention as used with a two-liter bottled beverage as the beverage package 150. The present invention is versatile enough that nearly any prepackaged beverage could be stored in it for preservation. In the embodiment depicted in FIG. 4, chamber 110 may be slightly longer than it would be for other uses, but, because tap stem 290 descends into the bottle, differing lengths are not necessarily required. FIG. 5b shows tap stem 290 in more detail. In a preferred embodiment, tap stem 290 is comprised of three parts: first segment 291 is rigid, second segment 292 is flexible, and third segment 293 is rigid. In this embodiment, stem 290 can reach the sides and corners of beverage packages, and can be used with packages of different sizes and heights, such as a growler or a two-liter bottle of soda.

FIG. 5a shows an exemplary embodiment of tap system 300, wherein the system is comprised of a nut 330, which couples with tap port 280, a hose 310, and a spout 320. This is merely one example of tap system 300, and, as discussed earlier herein, any number of tap systems can be coupled with lid 200.

Figure 6A:
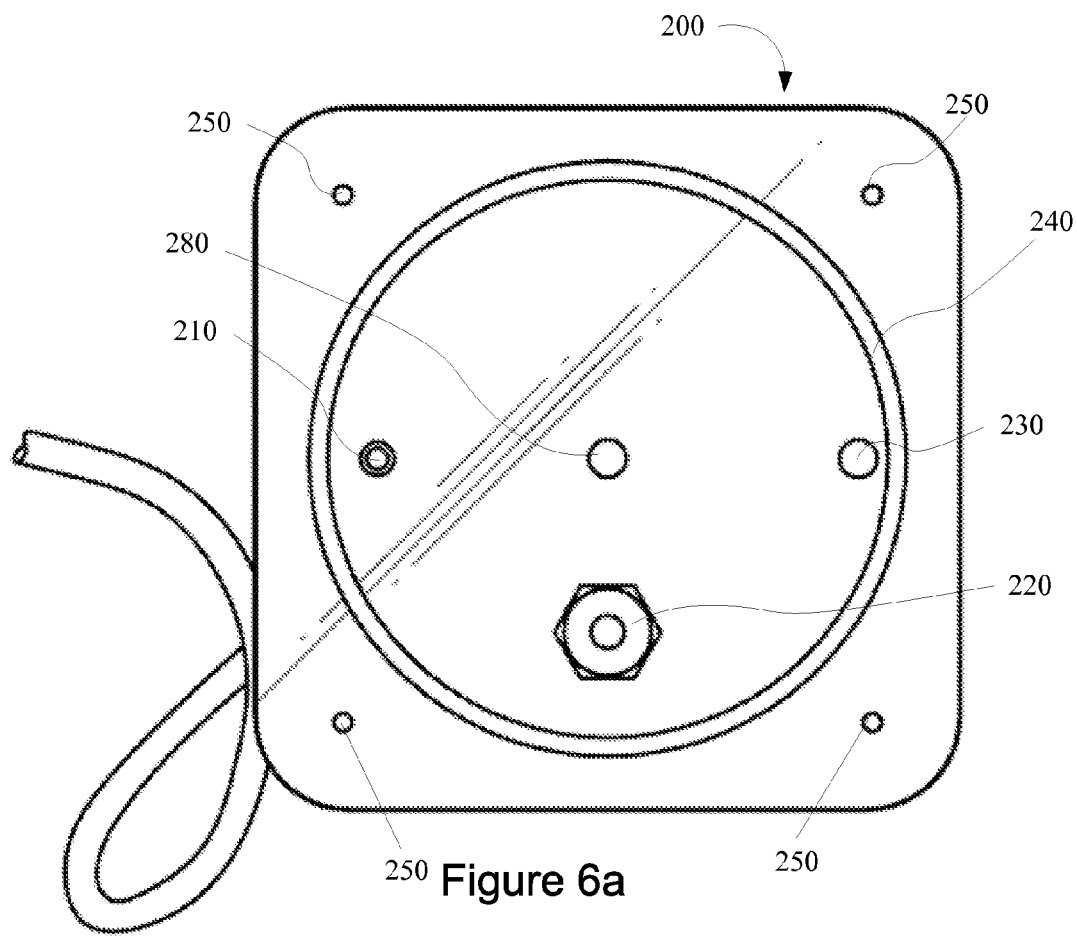
FIG. 6a is a bottom view of the lid of the receptacle.

FIG. 6a is a bottom view of lid 200. In this exemplary embodiment, lid 200 is of a larger area than the perimeter formed by the rim of chamber 110. Gasket 240 is disposed within a channel on the bottom surface of lid 200. The channel may be a square-cut channel for receiving the top rim of the chamber. The dimension of the channel and gasket are of substantially the same thickness as chamber 110, allowing the proper seal to form.

Figure 6B:
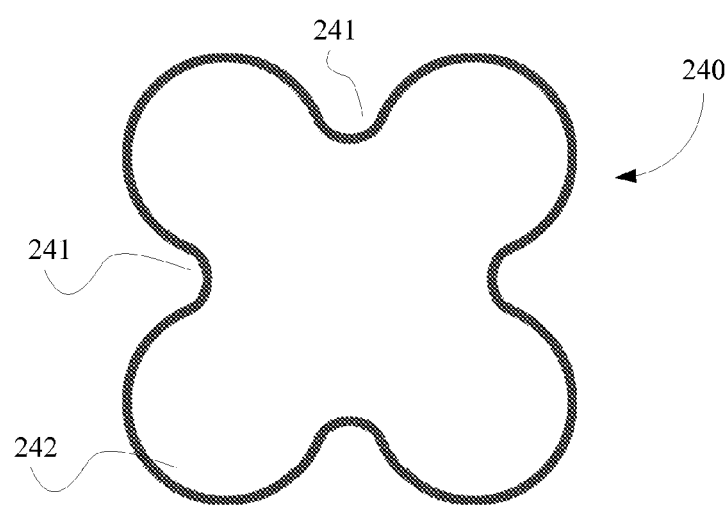
FIGS. 6b and 6c are a cross section view of a gasket for use in the lid of the receptacle and an isometric view of a gasket for use in the lid of the receptacle.
Figure 6C:
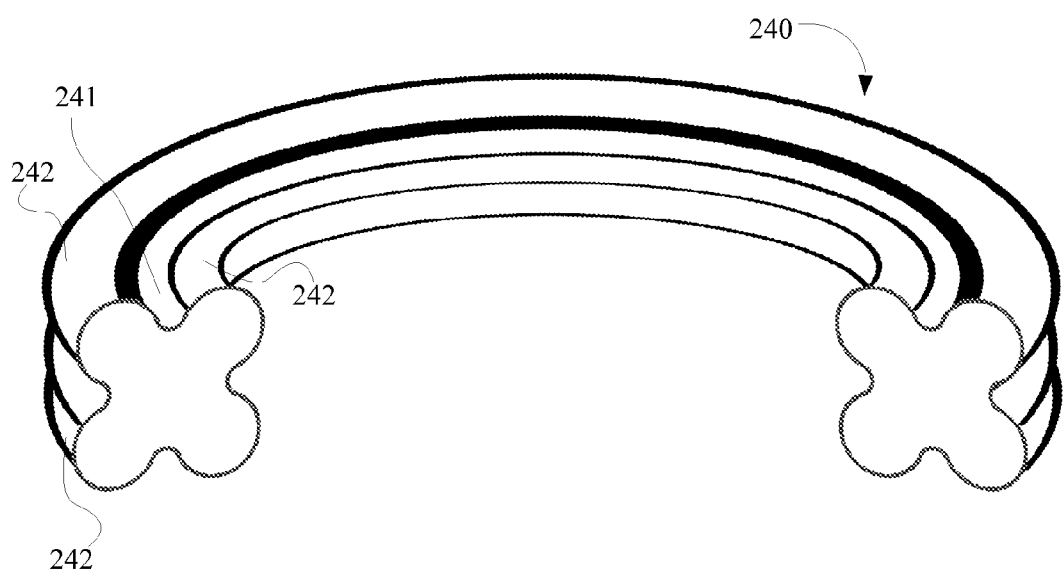

FIGS. 6b and 6c are a cross section view of a gasket for use in the lid of the receptacle and an isometric view of a gasket for use in the lid of the receptacle. In some embodiments, the gasket may be an X-Ring or a Quad-Ring. The gasket may have four lobes 242, each lobe having a rounded exterior profile. The four lobes 242 are separated by four concave sides 241. When the gasket is inserted into the square-cut channel on the bottom surface of the lid and compressed by the top rim of the chamber during tightening of the fasteners, the lobes separated by the concave sides allow the gasket to press into the corners of the channel, increasing the impermeability of the seal. It should be understood, though, that any number of gasket cross sections may provide a sufficient seal to prevent oxidation of the packaged beverage, and the disclosure of the X-Ring or Quad-Ring gasket shape should not be construed as limiting. (The proportion of the gasket in FIGS. 6b and 6c is not to scale, but the lobes have been enlarged relative to the diameter of the gasket to better depict the lobes and concave sides.)

Figure 7A:
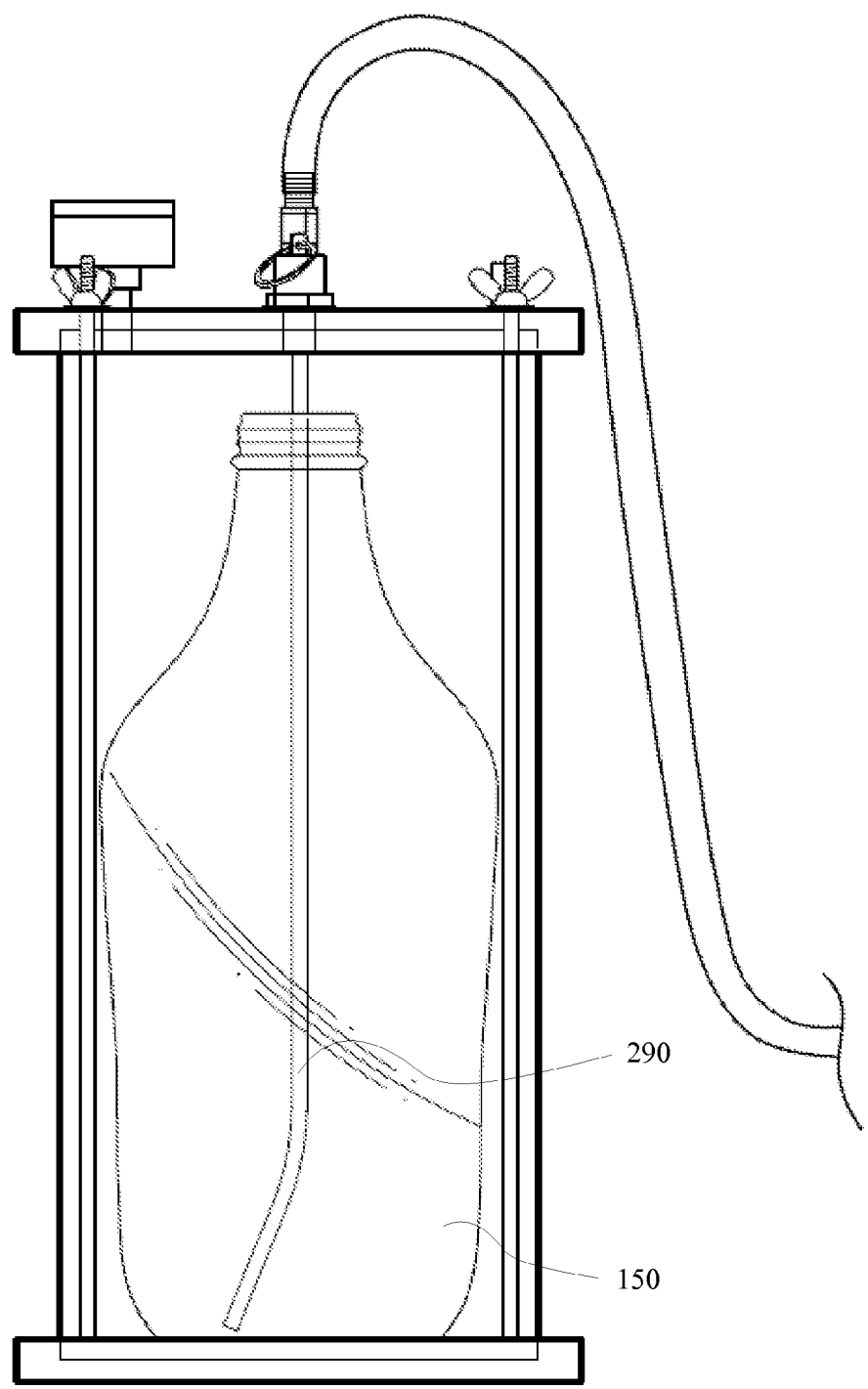
FIG. 7a is a side view of the receptacle.

FIG. 7a is a side view of one embodiment of the present invention, as it might be used with a beer growler. This figure shows how tap stem 290 can be placed in beverage package 150, allowing the stem to reach the sides of the beverage package and pulling more of the beverage than most pump systems allow.

Figure 7B:
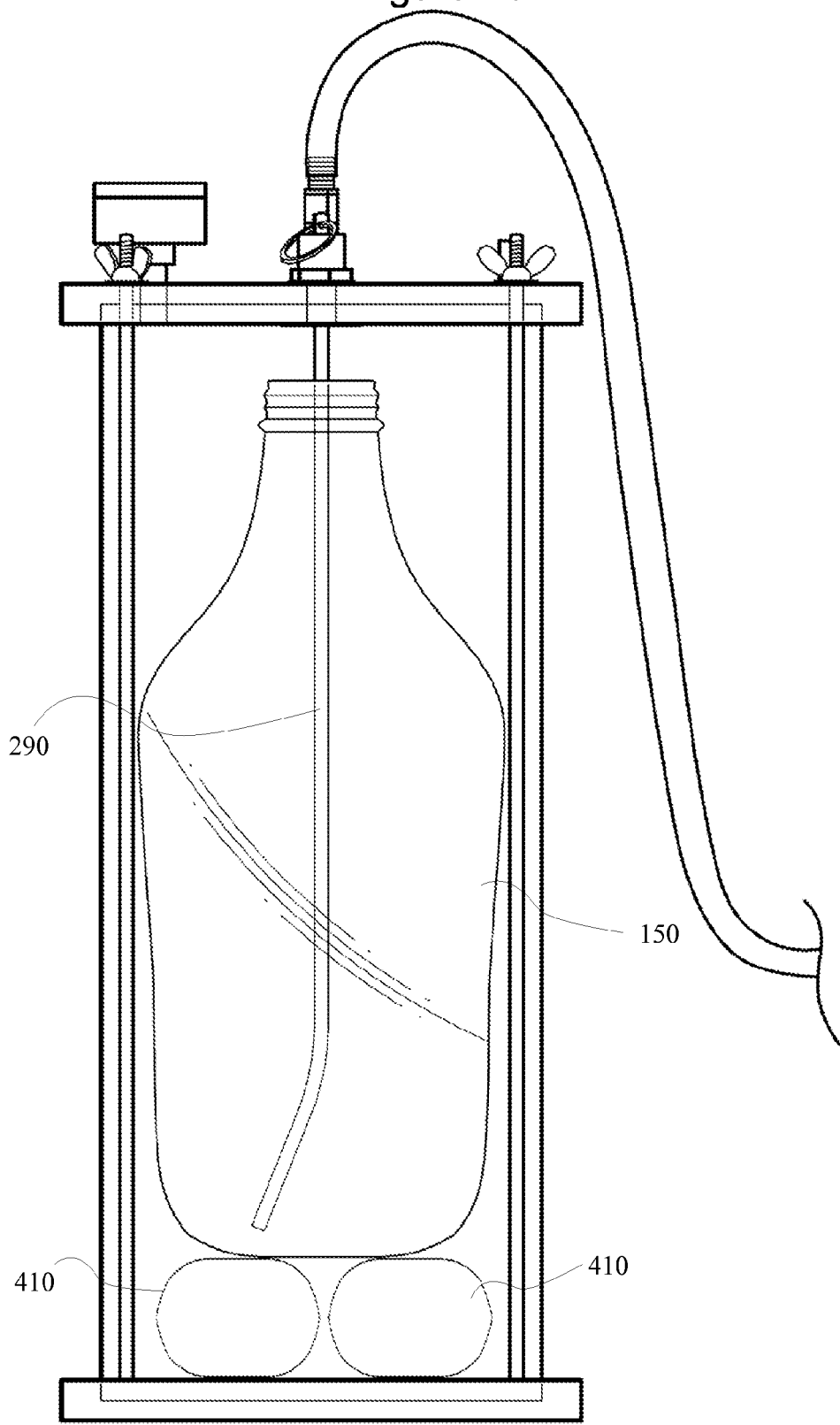
FIG. 7b is a side of an alternative embodiment of the receptacle.

FIG. 7b is a side of an alternative embodiment of the receptacle. In embodiments where the chamber is long or tall enough to accommodate a two-liter bottle of soda as the beverage package 150. When a beverage package shorter than a two-liter bottle of soda (such as a growler, as depicted here) is used with such an embodiment, one or more spacers 410 may be used and/or included with the receptacle to ensure the tap stem 290 is long enough to reach into the bottom corner of the beverage package. In different embodiments, the one or more spacers may be height-adjustable via stacking multiple spacers, inflation of the one or more spacers, or other adjustment means.

Figure 8:
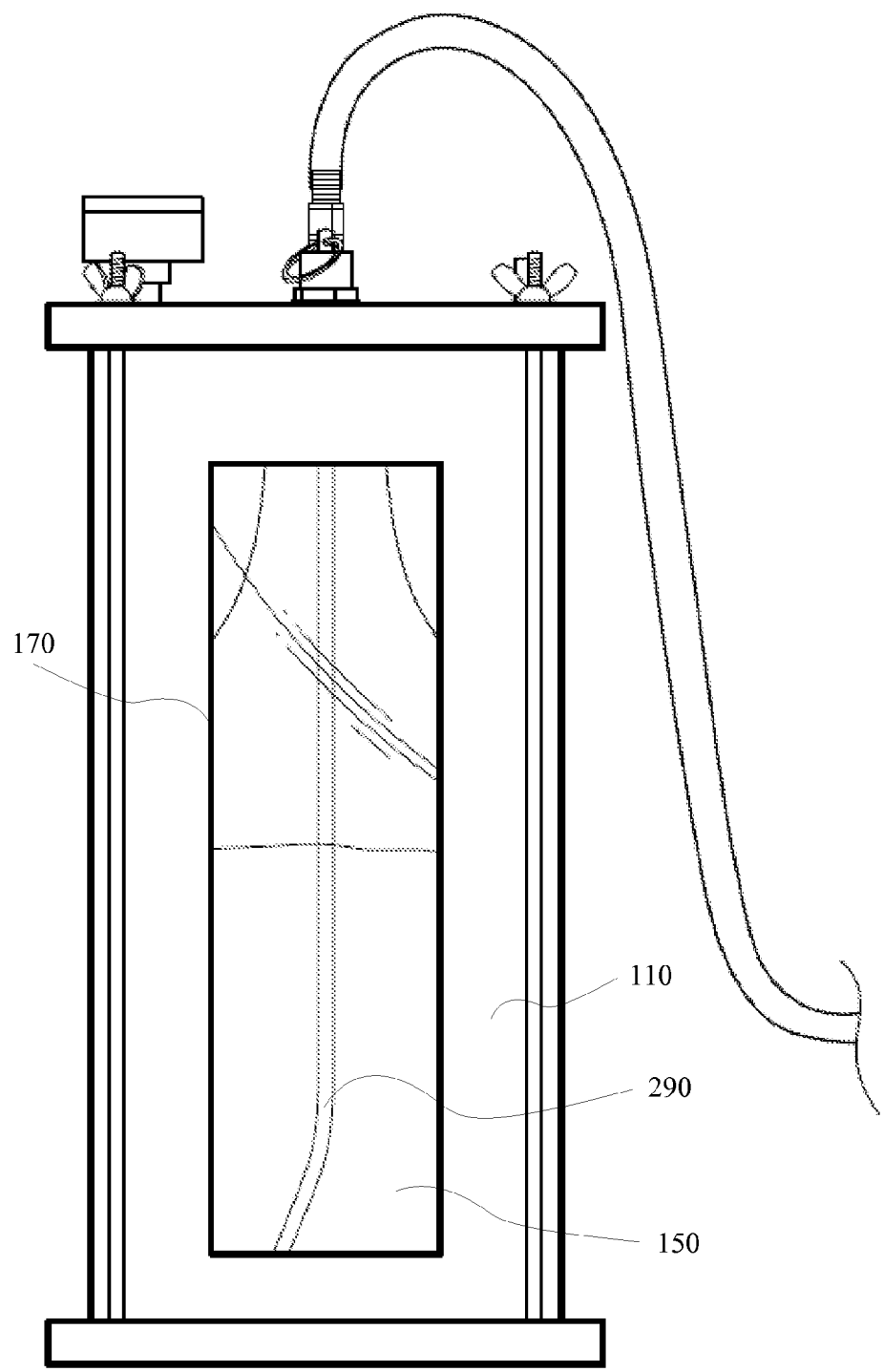
FIG. 8 is a side view of an alternative embodiment of the receptacle.

FIG. 8 is a side view of another embodiment of the present invention. In this embodiment, chamber 110 may be comprised of an opaque material, and window 170 may be present to allow a user to see the beverage, and, more specifically, the level or amount of beverage that remains in the package. Window 170 may also allow the user to see which beverage is stored in the receptacle. When chamber 110 is opaque or translucent, rather than transparent, it may allow for decorative elements to be included, such as lights or speakers.

Figure 10A:
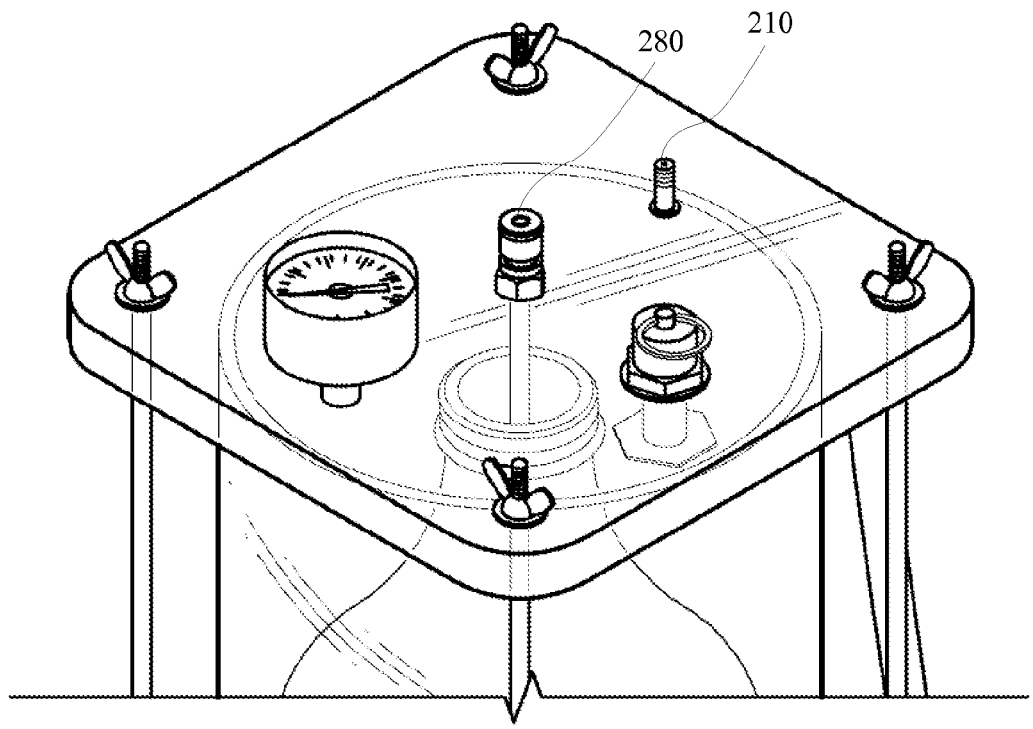
FIG. 10a is an isometric view of an alternative embodiment of the lid of the receptacle.
Figure 10B:
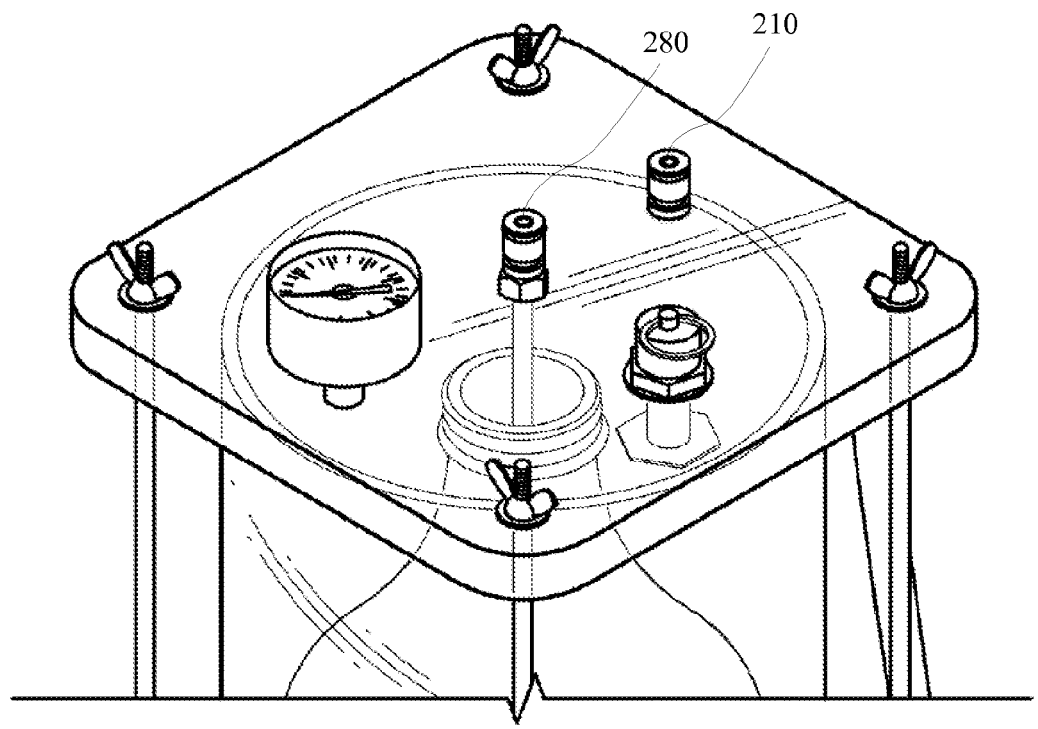
FIG. 10b is an isometric view of another alternative embodiment of the lid of the receptacle.

FIG. 9 is a side view of one embodiment of the present invention, wherein tap port 280 is coupled with a standard tap 360. In this depiction, the standard tap is a pump tap, but any number of standard tap systems may be coupled with tap port 280 without altering the function of the present invention. FIG. 10a shows lid 200 with tap port 280 as a ball lock coupler, allowing a user who already has the commonly used ball lock tap system to couple the system with lid 200. FIG. 10b shows lid 200 with ball lock couplers on both tap port 280 and gas valve 210, further lending utility to the use of standard ball lock tap systems.

Figure 11:
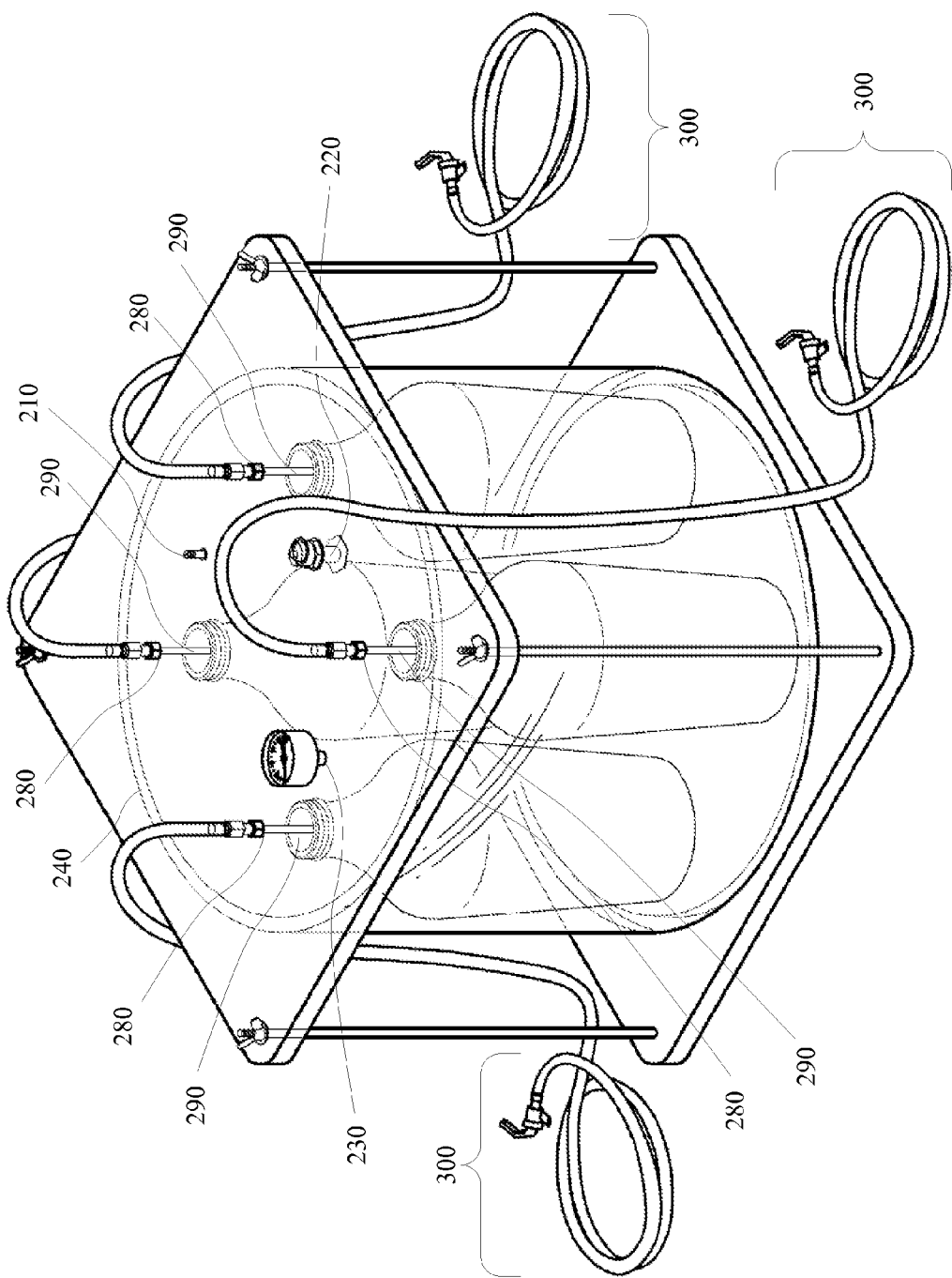
FIG. 11 is an isometric view showing an alternative embodiment of the receptacle, wherein the receptacle can be used to store multiple packaged beverages.

FIG. 11 shows an alternative embodiment of the present invention, wherein multiple packaged beverages are disposed inside chamber 110. In this embodiment, lid 200 still has one gas valve 210, one pressure relief valve 220, one pressure gauge port 230, and one gasket 240. In a non-limiting example, four bottles 150 are disposed inside chamber 110, and each bottle has its own tap port 280 and tap stem 290. Each tap port 280 can be coupled with tap system 300. This is an exemplary embodiment, and it should not be construed as limiting the number of taps to four. The system may be used with one, two, three, five, or any other number. In some applications, three may be an optimum safe number of packages when factoring pressure loading over a large area. However, a multiple bottle embodiment may contain any number of tap ports and packaged beverages without altering the function of the multiple bottle embodiment.

Figure 12:
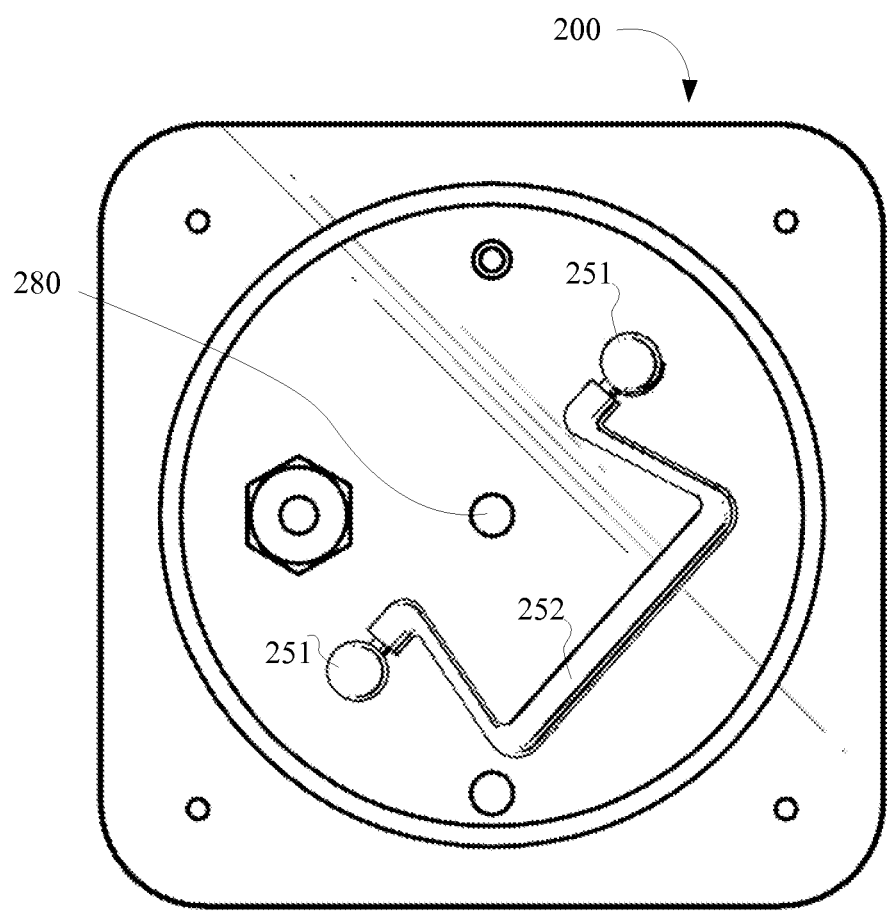
FIG. 12 is a top view of another alternative embodiment of the receptacle.

FIG. 12 is a top view of another alternative embodiment of the receptacle. In some embodiments, the receptacle is provisioned with a carrying handle 252. The carrying handle may be disposed between mounting studs 251, which are disposed to either side of tap port 280. In different embodiments, the receptacle may have more than one carrying handle, may include a different type of carrying handle than the swivelable handle, and/or may have one or more handles mounted on a different surface of the receptacle.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A beverage preservation device, comprising:
   a vessel;
   a lid, the lid including at least a top surface and a bottom surface, the lid removably coupled with the vessel;
   a gas valve, the gas valve disposed through the lid;
   a pressure relief valve, the pressure relief valve disposed through the lid;
   a tap port, the tap port extending from the top surface of the lid; and
   a tap stem, the tap stem extending from the bottom surface of the lid, including at least:
      a rigid first portion, the rigid first portion coupled with the tap port;
      a flexible second portion, the flexible second portion coupled with the rigid first portion; and
      a rigid third portion, the rigid third portion coupled with the flexible second portion.

2. The beverage preservation device of claim 1, wherein the lid comprises:
   a gasket disposed on the bottom surface of the lid.

3. The beverage preservation device of claim 1, wherein the lid comprises:
   a pressure gauge port disposed through the lid.

4. The beverage preservation device of claim 1, wherein the tap port comprises:
   at least one of a ball lock valve or a sankey valve.

5. The beverage preservation device of claim 1, wherein the tap port comprises:
   at least one of a hose barb or a screw valve.

6. The beverage preservation device of claim 1, wherein the flexible second portion comprises:
   a slightly curved flexible second portion.

7. The beverage preservation device of claim 1, wherein the lid and the vessel are removably coupleable.

8. The beverage preservation device of claim 7, wherein the lid forms an airtight seal with the vessel when the lid and vessel are removably coupled.

9. The beverage preservation device of claim 1, wherein the beverage preservation device is configured for dispensing beverage from at least two beverage packages using at least two corresponding tap systems.

10. The beverage preservation device of claim 1, wherein the beverage preservation device is configured for dispensing beverage from at least two beverage packages using at least two corresponding tap systems, the beverage preservation device pressurized to a single pressure level via a single gas valve.

11. The beverage preservation device of claim 1, further comprising:
    a carrying handle coupled with the top surface of the lid.

12. The beverage preservation device of claim 1, wherein the vessel comprises:
    a vessel configured for viewing at least one of a level or an amount of beverage remaining in a beverage package within the vessel.

13. A beverage preservation device, comprising:
    a vessel, the vessel including at least:
       a base; and
       a chamber joined with and perpendicular to the base, wherein the joint is airtight;
    a lid, the lid including at least a top surface and a bottom surface, wherein an area of the lid is approximately equal to an area of the base, the lid including at least:
       a gasket, the gasket disposed on the bottom surface of the lid, wherein a perimeter formed by the gasket is approximately equal to a perimeter of the chamber;
       a tap port, the tap port disposed inside the perimeter of the gasket and through the top surface and the bottom surface of the lid;
       a gas valve, the gas valve disposed inside the perimeter of the gasket and through the top surface and the bottom surface of the lid, wherein the inlet of the valve is accessible from the top surface of the lid; and
       a pressure relief valve disposed inside the perimeter of the gasket and through the top surface and the bottom surface of the lid, wherein a control handle of the pressure relief valve is accessible from the top surface of the lid; and
    a tap stem, the tap stem including at least:
       a rigid first portion, the rigid first portion coupled with the tap port;
       a flexible second portion, the flexible second portion coupled with the rigid first portion; and
       a rigid third portion, the rigid third portion coupled with the flexible second portion.

14. The beverage preservation device of claim 13, wherein the lid is removably coupleable with the vessel, the gasket of the lid forming an airtight joint between the lid and the vessel.

15. The beverage preservation device of claim 13, wherein the lid comprises:
    a pressure gauge port, the pressure gauge port disposed within inside the perimeter of the gasket and through the top surface and the bottom surface of the lid.

16. The beverage preservation device of claim 13, wherein the tap port comprises:
    a tap port configured for receiving at least a portion of a tap system.

17. The beverage preservation device of claim 13, wherein the tap stem comprises:

a tap stem configured for reaching at least one of sides or corners of beverage packages inserted into the beverage preservation device.

18. The beverage preservation device of claim 13, further comprising:
    a pressure gauge port, the pressure gauge port disposed inside the perimeter of the gasket and through the top surface and the bottom surface of the lid; and
    a pressure gauge removably inserted into the pressure gauge port.

19. The beverage preservation device of claim 13, wherein the device is configured for supplementing pressure lost by dispensing a beverage content.

20. A beverage preservation device, comprising:
    storage means for removably storing a beverage package;
    means for pressurizing the storage means including at least a lid configured for sealing the storage means; and
    means for dispensing a beverage from a beverage package within the storage means, including at least:
        a tap port, the tap port extending from a top surface of the lid; and
        a tap stem, the tap stem extending from a bottom surface of the lid, including at least:
            a rigid first portion, the rigid first portion coupled with the tap port;
            a flexible second portion, the flexible second portion coupled with the rigid first portion; and
            a rigid third portion, the rigid third portion coupled with the flexible second portion.

* * * * *